United States Patent [19]
Atherton et al.

[11] Patent Number: 5,797,554
[45] Date of Patent: Aug. 25, 1998

[54] CUSHION GRIP FOR FISHING REEL

[75] Inventors: Randy Atherton, Anniston, Ala.; Roy Stiner; Frank Cooper, both of Tulsa, Okla.; Jack Robbins, Derby, Kans.

[73] Assignee: Brunswick Corporation, Tulsa, Okla.

[21] Appl. No.: 728,058

[22] Filed: Oct. 9, 1996

[51] Int. Cl.⁶ .................................................. A01K 87/06
[52] U.S. Cl. ............................................ 242/316; 242/311
[58] Field of Search .................................. 242/316, 310, 242/311

[56] References Cited

U.S. PATENT DOCUMENTS

| | | | |
|---|---|---|---|
| 2,834,559 | 5/1958 | Nagy | 242/311 X |
| 3,028,115 | 4/1962 | Hammer | 242/311 X |
| 4,830,306 | 5/1989 | Tsunoda et al. | 242/316 |

Primary Examiner—Daniel P. Stodola
Assistant Examiner—Emmanuel M. Marcelo
Attorney, Agent, or Firm—Wood, Phillips, VanSanten, Clark & Mortimer

[57] ABSTRACT

A fishing reel has a main body and a mounting assembly for connecting the fishing reel to a fishing rod. At least one cushion member is provided on the mounting assembly that has an exposed, compressible surface that is engageable by a user grasping the fishing reel with the fishing reel in an operative position on a fishing rod.

13 Claims, 4 Drawing Sheets

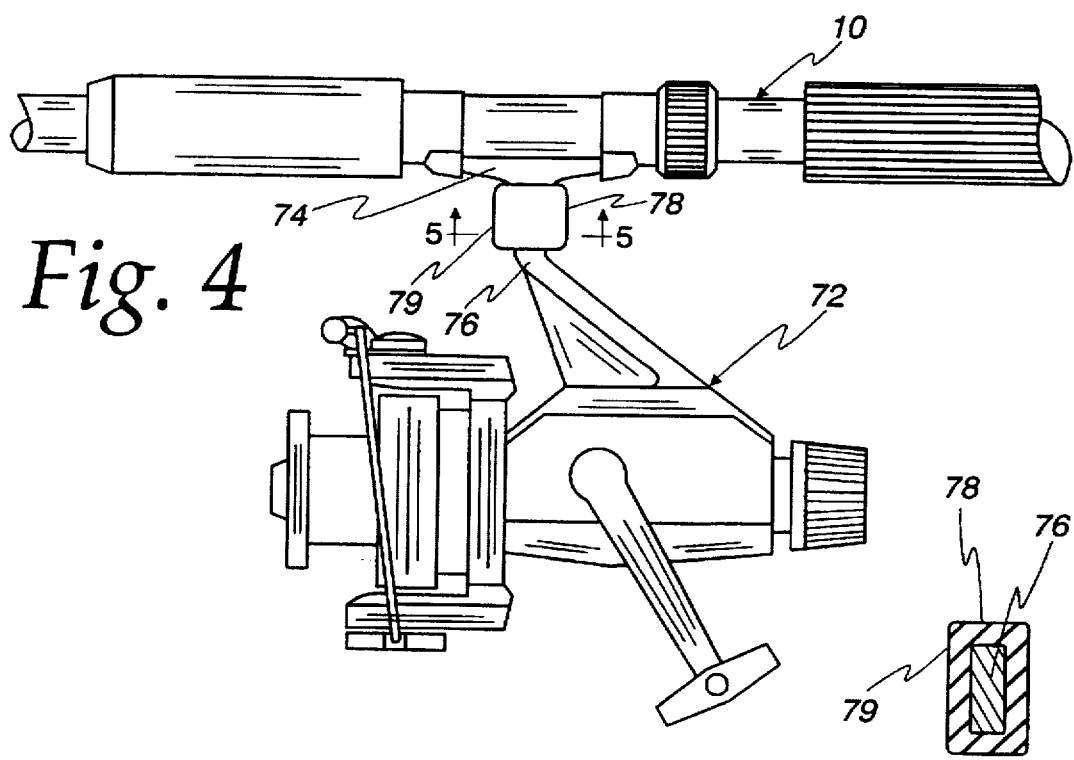
Fig. 4
Fig. 5
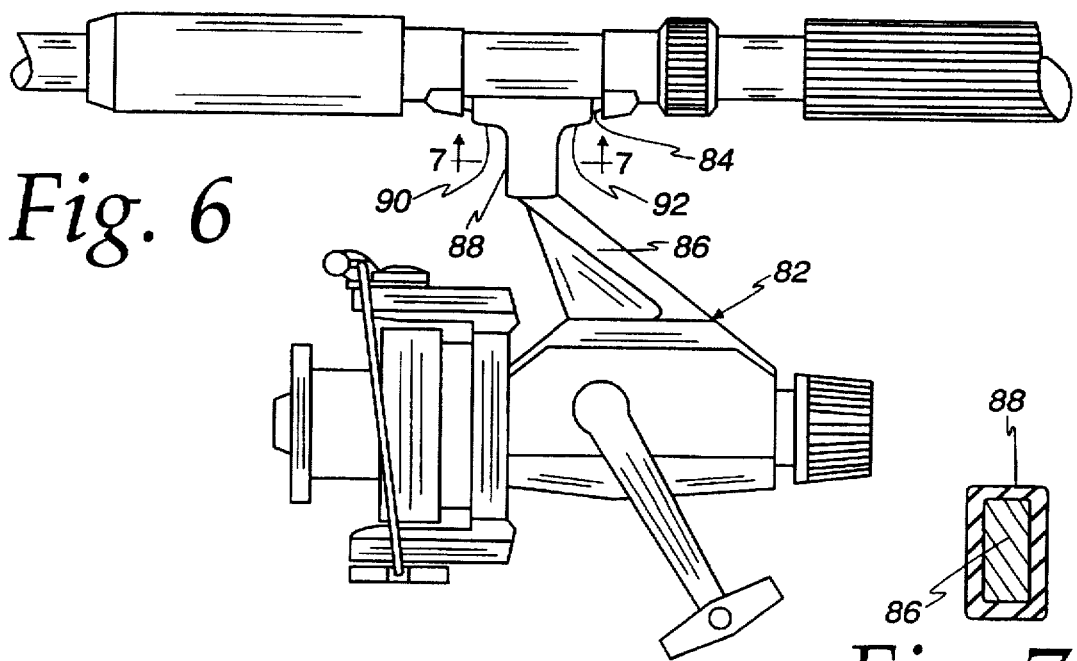
Fig. 6
Fig. 7

5,797,554

1

CUSHION GRIP FOR FISHING REEL

BACKGROUND OF THE INVENTION

1. Field of the Invention

This invention relates to fishing reels and, more particularly, to a cushion element on a fishing reel to allow comfortable gripping thereof in use.

2. Background Art

Over-the-rod, baitcast-type fishing reels are typically mounted on fishing rods between the ends of a cushioned handle that may be made from cork or compressible rubber. The user will typically grip the rod so that the compressible material resides in the user's palm. The thumb, index finger and middle finger then cooperatively grip the rod handle to thereby maintain the rod and reel in a desired position. The index and middle fingers will normally engage an uncushioned part of the fishing rod, including a finger grip thereon, projecting transversely to the length of the rod.

In under-the-rod type reels, such as spinning reels, an elongate mounting foot is provided with a depending stem, with the mounting foot and stem cooperatively producing a T shape. The user will typically hold the rod and reel combination by directing the stem between the index and middle fingers and use the index and middle fingers to bear the fishing rod portion, diametrically opposite to the mounting foot, against the palm.

In a typical construction, the mounting foot and stem are made from metal, plastic, or a hard composite material. Pressure contact between the index finger, middle finger and the thumb on this material in both performing a cast and retrieving line may be uncomfortable to the user, particularly after long periods of use. Users may experience this discomfort even though the contact surfaces are smooth and contoured to minimize the presence of sharp edges in the gripping region.

SUMMARY OF THE INVENTION

In one form of the invention, a fishing reel is provided having a main body and a mounting assembly for connecting the fishing reel to a fishing rod. At least one cushion member is provided on the mounting assembly that has an exposed, compressible surface that is engageable by a user grasping the fishing reel with the fishing reel in an operative position on a fishing rod.

In one form, the mounting assembly includes an elongate mounting foot for placement against an elongate fishing rod so that the length of the mounting foot is aligned with the length of the fishing rod with the fishing reel in an operative position on the fishing rod. The mounting assembly further has a mounting stem with a length that projects angularly to the length of the mounting foot, with the at least one cushion member being on the mounting stem.

The at least one cushion member may extend continuously around a part of the mounting stem. Alternatively, at least one cushion member could be placed on one or both surfaces on the mounting stem facing oppositely and in a lengthwise direction relative to the mounting foot.

The at least one cushion element may be a rubber material.

The at least one cushion member has a body that can be bonded to the mounting assembly through the use of an adhesive. Alternatively, the cushion member could be molded into the fishing reel or could be formed as a coating on at least part of the mounting assembly.

In another form of the invention, a fishing rod with an elongate body with a cylindrical gripping portion is provided

2 in combination with a fishing reel mounted in an operative position on the fishing rod body. The fishing reel in the operative position is situated so that the user's hand extends around a portion of the fishing rod and against the fishing reel to hold the fishing rod and reel for operation thereof. There is at least one cushion member on at least one of the fishing reel and a part of the fishing rod, at other than the cylindrical gripping portion, that has an exposed compressible surface that is engageable by a user holding the fishing rod and reel for operation thereof.

BRIEF DESCRIPTION OF THE DRAWINGS

FIG. 4 is a view as in FIG. 2 with a modified form of cushion member, according to the present invention, incorporated therein;

FIG. 5 is a cross-sectional view of the fishing reel taken along line 5—5 of FIG. 4;

FIG. 6 is a view as in FIGS. 2 and 4 with a further modified form of cushion member, according to the present invention, incorporated therein;

FIG. 7 is a cross-sectional view of the fishing reel taken along line 7—7 of FIG. 6;

DETAILED DESCRIPTION OF THE DRAWINGS

Figure 1:
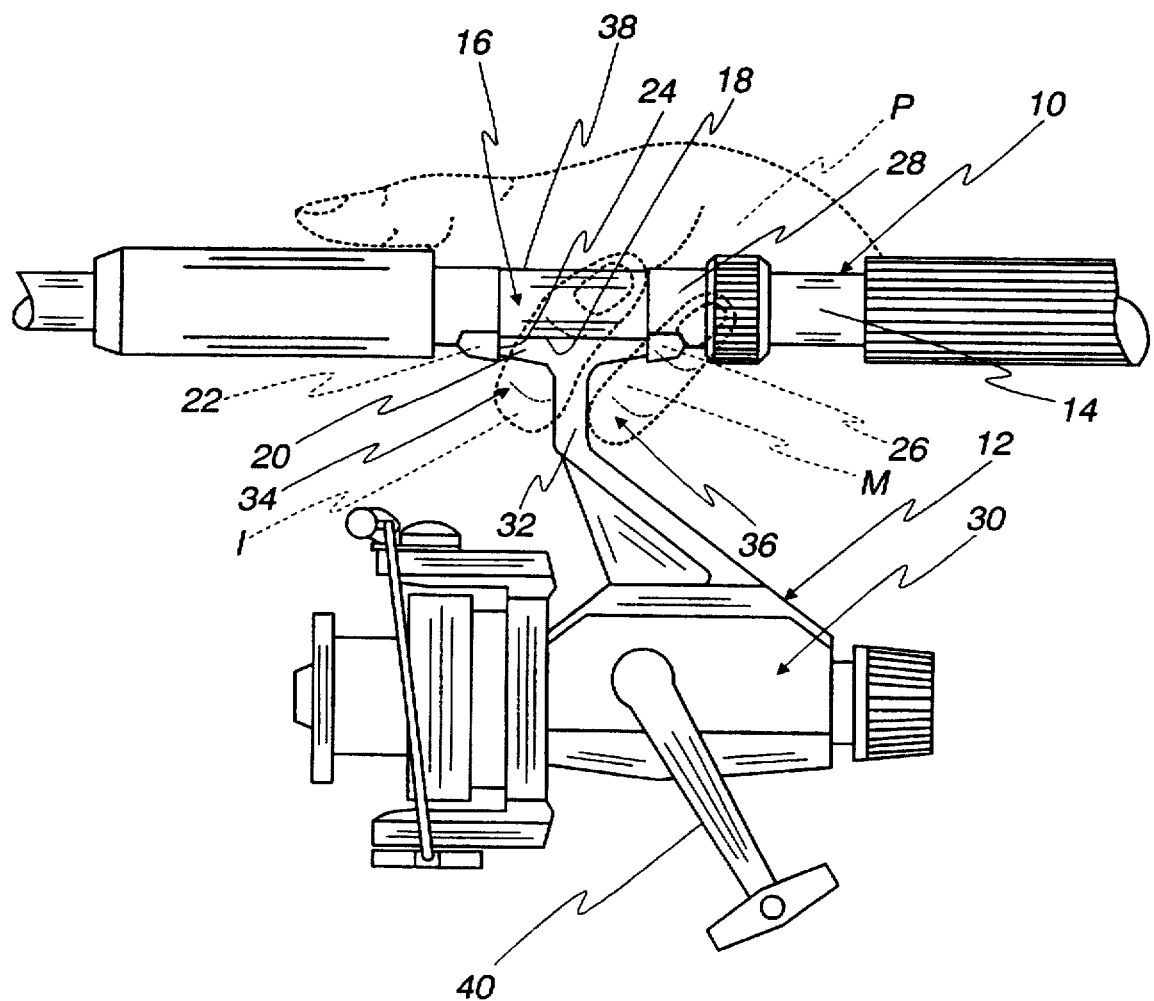
FIG. 1 is a side elevation view of a portion of a conventional fishing rod with a conventional fishing reel attached thereto in an operative position.

In FIG. 1, a conventional fishing rod 10 is shown with a conventional fishing reel 12 mounted thereon in an operative position in conventional manner. The fishing rod 10 has an elongate body 14 that has a mounting region at 16 which defines a seating surface 18 for an elongate mounting foot 20 on the fishing reel 12. The forward portion 22 of the mounting foot 20 seats in a receptacle 24 defined on the fishing rod 10. The rear portion 26 of the mounting foot 20 is maintained against the seating surface 18 by a locking ring 28 that is slidable lengthwise of the fishing rod 10 between a) a release position wherein the fishing reel 12 can be selectively placed in the operative position of FIG. 1 and separated from the fishing rod 10 and b) a locking position, as shown in FIG. 1 wherein the mounting foot 20 is captive against the rod surface 18 and prohibited from moving lengthwise of the fishing rod 10 or transversely to the length of the fishing rod 10 out of the operative position. This mounting arrangement is common to "under-the-rod" type reels, such as spinning reels, which are well known in the art.

The mounting foot 20 is connected to the body 30 of the fishing reel 12 through a depending mounting stem 32. This arrangement defines regions 34, 36, fore and aft of the mounting stem 32, which accommodate the fingers of the user's hand that is holding the combined fishing rod 10 and fishing reel 12 in an operating position. More particularly, for a right-handed user, the palm P of the right hand is placed against the upper rod surface 38. The index finger I and middle finger M are curled underneath the rod 10 to straddle the mounting stem 32, and draw the rod surface 38 into the palm P. This position is maintained to both perform a cast and retrieve line, with the latter accomplished through a crank handle 40, which is operated by the left hand.

Typically, the mounting foot 20, mounting stem 32, and reel body 30 are made from a hard material, that may be metal, plastic, or a composite. As the user casts and retrieves, the surfaces on the fishing reel 12 against which the user's hand bears, tend to abrade the user's hand. This is particularly true with corner surfaces and irregularities that are inevitably formed on virtually all types of fishing reels. Eventually, this condition may lead to significant discomfort on the user's part and in a worse case the development of blisters.

Figure 2:
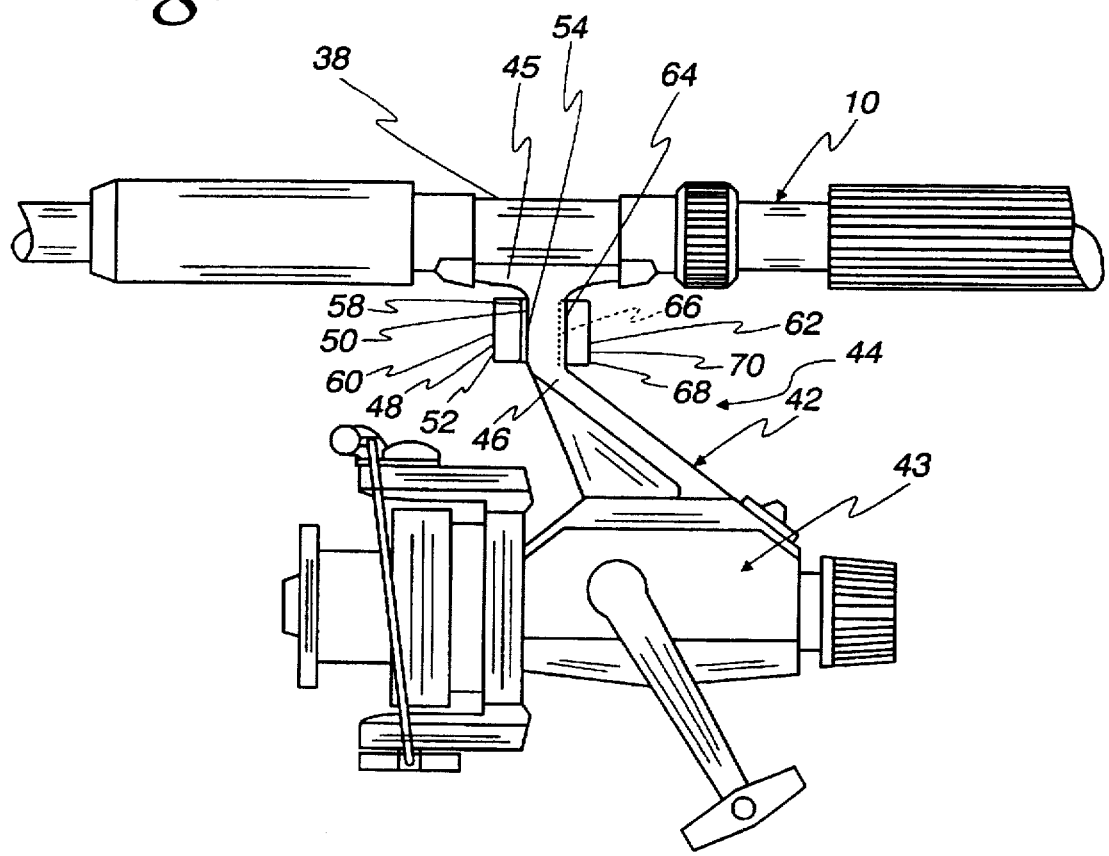
FIG. 2 is a side elevation view of a portion of a fishing rod with a fishing reel in an operative position thereon and with one form of cushion member, according to the present invention, incorporated therein.
Figure 3:
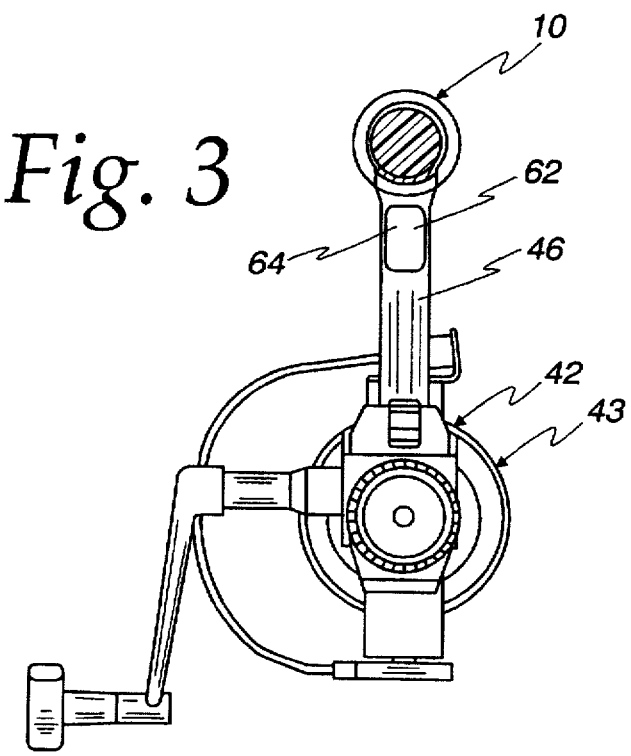
FIG. 3 is an end elevation view of the fishing rod and reel of FIG. 2.

One form of the present invention is shown in FIGS. 2 and 3 on a fishing reel 42 that is functionally the same as the fishing reel 12. The fishing reel 42 has a main body 43 connected to the fishing rod 10 through a mounting assembly 44. The mounting assembly 44 has a mounting foot 45 that is mounted to the fishing rod 10 in the same manner as is the foot 20 on the fishing reel 12, and a mounting stem 46 projecting angularly from the mounting foot 45 and rigidly connecting between the mounting foot 45 and fishing reel body 43.

According to the invention, one cushion member 48 is attached to the mounting stem 46 on a forwardly facing surface 50 on the mounting stem 46. The cushion member 48 is made to have an exposed, compressible surface 52. This may be accomplished by making the cushion member 48 entirely or partially from rubber or other suitable compressible material.

To mount the cushion member 48 to the mounting stem 46, a double-sided adhesive element 54 is employed. One side of the adhesive element 54 is adhered to the mounting stem surface 50, with the oppositely facing surface 58 adhered to the body 60 of the cushion member 48.

A second cushion member 62 is attached at the rearwardly facing surface 64 of the mounting stem 46. In this construction, an undercut receptacle 66 is formed in the mounting stem 46. The body 68 of the second cushion member 62 can be formed in the receptacle 66 through a secondary molding step. The body 68 is molded so that it projects rearwardly out of the receptacle 66 to define a rearwardly facing, compressible surface 70. Of course, both cushion members 48, 62 can be attached in the same manner.

With this arrangement, the user grasps the rod and reel combination in the same manner as in the prior art combination of FIG. 1. That is, the palm is initially placed against the upper surface 38 with the index finger I being curled under the mounting foot 45 and abutted to the forwardly facing surface 52 of the cushion member 48. The middle finger M curls under the mounting foot 45 and bears upon the compressible surface 70 of the cushion member 62. With a slight pinching force between the index and middle fingers, the mounting stem 46 and cushion members 48, 62 become captive between the index and middle fingers. The surfaces 52, 70 deform slightly under this pressure and define a comfortable grip for the user.

In FIGS. 4 and 5, a fishing reel 72 is shown that is functionally the same as the fishing reels 12, 42, previously described. The fishing reel 72 has a mounting foot 74 and a depending stem 76 projecting angularly therefrom, with the mounting foot 74 connected to the fishing rod 10 in the same manner as described with respect to FIGS. 1–3. In this embodiment, a cushion member 78 wraps continuously around the stem 76 in the region to be contacted by the index and middle fingers. The material making up the cushion member 78 can be the same as previously described to define a compressible outer surface 79 to be contacted by the user.

In FIGS. 6 and 7, a fishing reel 82 is shown and is functionally the same as the fishing reels 12, 42, 72. The fishing reel 82 has a mounting foot 84 and a mounting stem 86 which have a cushion member formed thereon by coating a substantial portion, or all, of the exposed surfaces of the mounting foot 84 and mounting stem 86 with a material that is compressible when cured. The coating 88 has the additional advantage that it defines compressible surfaces 90, 92 under the mounting foot 84 which can be comfortably gripped by the user holding the rod in the normal operating position.

Figure 8:
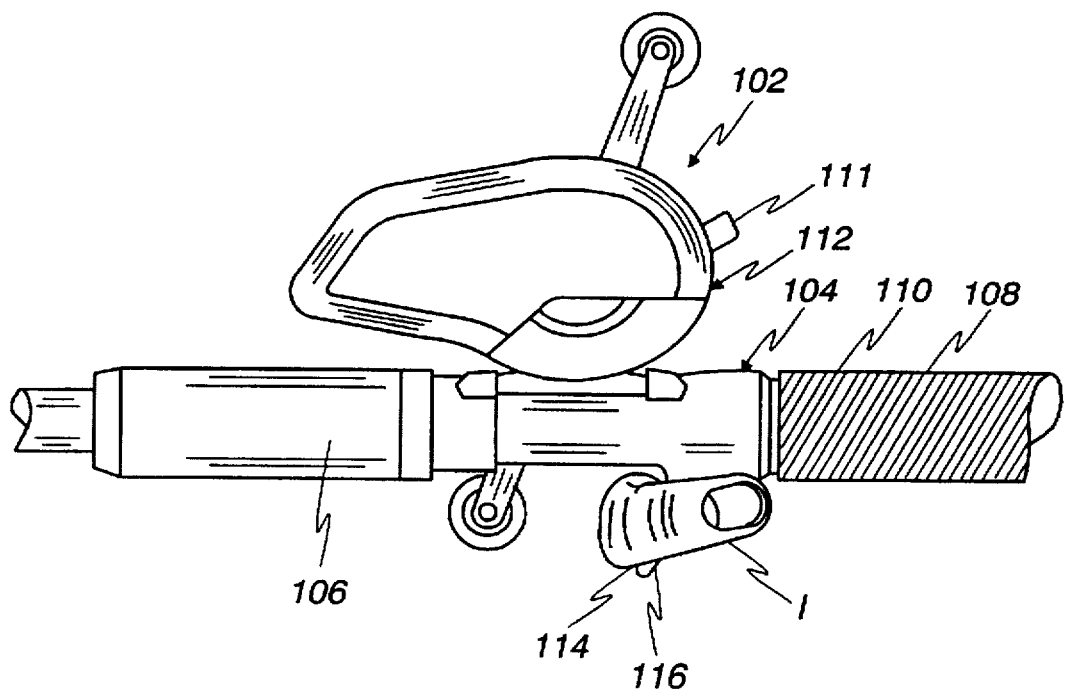
FIG. 8 is a side elevation view of a portion of a fishing rod with another type of fishing reel in an operative position thereon and with a cushion member, according to the present invention, incorporated therein.
Figure 9:
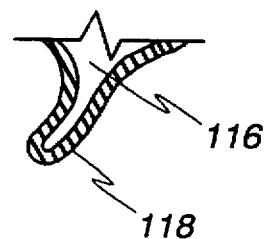
FIG. 9 is a side elevation view of part of the fishing rod in FIG. 8 with the inventive cushion member thereon in the form of a coating.

In FIGS. 8 and 9, another form of fishing reel is shown at 102. The fishing reel 102 is mounted to a fishing rod 104 in an over-the-rod arrangement. This is typical of a baitcast type fishing-rod and reel combination. The fishing rod 104 has a fore, cylindrical gripping portion 106 and a rear, cylindrical gripping portion 108, each of which are cushioned, as by providing a foam or cork covering thereon.

To operatively engage this rod and reel combination, the user places the upper surface 110 of the rod 104 behind the reel 102 in the palm of the hand so that the user's thumb is movable to engage a thumb button 111 at the rear portion 112 of the fishing reel 102. At the same time, the index finger can be wrapped under the rod 104 to engage a forwardly facing surface 114 on a curved grip element 116. According to the invention, a cushion member 118, in the form of a preformed element or a coating, is disposed over part or all of the grip element 116 to afford the same cushioning effect as previously described.

The foregoing disclosure of specific embodiments is intended to be illustrative of the broad concepts comprehended by the invention.

We claim:

1. In combination:

a fishing rod having an elongate body with a cylindrical gripping portion;

a fishing reel mounted in an operative position on the fishing rod body, said fishing reel having a main body, an elongate mounting foot, and an elongate mounting stem projecting angularly to the length of the mounting foot and connecting between the mounting foot and the main body, said fishing reel in the operative position being situated so that a user's hand extends around a portion of the fishing rod and against the fishing reel to hold the fishing rod and reel for operation thereof, the mounting stem residing between adjacent fingers on a user's hand with a user holding the fishing rod for operation thereof; and at least one cushion member on the mounting stem, the at least one cushion member having an exposed compressible surface facing lengthwise of the fishing rod and engageable by one of the adjacent fingers of the hand of a user holding the fishing rod and reel for operation thereof, wherein the exposed compressible surfaces on the totality of cushion members on the mounting stem extend only partially around the mounting stem.

2. The combination according to claim 1 wherein the mounting stem has a first surface facing lengthwise relative to the length of the fishing rod body with the fishing reel in the operative position and a second surface facing oppositely to the first surface and the at least one cushion member is on at least one of the first and second surfaces.

3. The combination according to claim 2 wherein there is a second cushion element on the other of the first and second surfaces.

4. The combination according to claim 1 wherein the at least one cushion member comprises rubber.

5. The combination according to claim 1 wherein the at least one cushion member is molded into the at least one of the fishing rod and fishing reel.

6. The combination according to claim 1 wherein the cushion member comprises a coating on the at least one of the fishing rod and fishing reel.

7. A fishing reel comprising:

a main body;

a mounting assembly for connecting the main body of the fishing reel to a fishing rod, the mounting assembly comprising an elongate mounting foot for placement against a fishing rod and a mounting stem connecting between the mounting foot and the main body; and a first cushion member on and extending only partially around the mounting stem and having an exposed, compressible surface that is engageable by a user grasping the fishing reel for operation thereof with the fishing reel in an operative position on a fishing rod, there being no cushion member or cushion members which in conjunction with the first cushion member extend fully around the mounting stem.

8. The fishing reel according to claim 7 including a second cushion member on the mounting stem and having an exposed, compressible surface that is engageable by a user grasping the fishing reel for operation thereof with the fishing reel in an operative position on a fishing rod.

9. The fishing reel according to claim 8 wherein the surface on the first cushion member faces in a first direction and the surface on the second cushion member faces in a second direction oppositely to the first direction, and the first and second cushion members are fully separate, each from the other.

10. The fishing reel according to claim 9 wherein the elongate mounting foot has a length and the surfaces on the first and second cushion members each face lengthwise relative to the length of the mounting foot.

11. The fishing reel according to claim 7 where the first cushion member comprises rubber.

12. A fishing reel comprising:

a main body;

a mounting assembly for connecting the main body of the fishing reel to a fishing rod, the mounting assembly comprising an elongate mounting foot for placement against a fishing rod and a mounting stem connecting between the mounting foot and the main body; and a first cushion member on and extending only partially around the mounting stem and having an exposed, compressible surface that is engageable by a user grasping the fishing reel for operation thereof with the fishing reel in an operative position on a fishing rod, wherein the elongate mounting foot has a length and there is an undercut receptacle in the mounting stem opening lengthwise with respect to the mounting foot and the first cushion member resides at least partially within the undercut receptacle.

13. The fishing reel according to claim 12 wherein the first cushion member is formed in the undercut receptacle through a secondary molding process.

* * * * *